(12) United States Patent
Marx et al.

(10) Patent No.: US 9,369,532 B2
(45) Date of Patent: Jun. 14, 2016

(54) METHOD AND APPARATUS FOR PROVIDING CONTEXTUAL CONTEXT TO A USER DEVICE

(71) Applicant: QUALCOMM Incorporated, San Diego, CA (US)

(72) Inventors: Peter S Marx, San Diego, CA (US); Eric P Bilange, San Diego, CA (US); Cormac S Conroy, Palo Alto, CA (US)

(73) Assignee: Qualcomm Incorporated, San Diego, CA (US)

( * ) Notice: Subject to any disclaimer, the term of this patent is extended or adjusted under 35 U.S.C. 154(b) by 207 days.

(21) Appl. No.: 13/794,593

(22) Filed: Mar. 11, 2013

(65) Prior Publication Data

US 2014/0250164 A1      Sep. 4, 2014

Related U.S. Application Data (60) Provisional application No. 61/771,485, filed on Mar. 1, 2013.

(51) Int. Cl.
*G06F 15/16*      (2006.01)
*H04L 29/08*      (2006.01)
*G06F 17/30*      (2006.01)

(52) U.S. Cl.
CPC ............ *H04L 67/18* (2013.01); *G06F 17/3087* (2013.01); *G06F 17/30864* (2013.01)

(58) Field of Classification Search
CPC .............. H04L 67/18; G06F 17/30867; G06F 17/3087

USPC .......................................... 709/203, 219, 246
See application file for complete search history.

(56) References Cited

U.S. PATENT DOCUMENTS

| | | | |
|---|---|---|---|
| 9,060,031 B1* | 6/2015 | Taylor ................. | H04L 67/2814 |
| 2004/0015484 A1* | 1/2004 | Debaty ............................ | 707/3 |
| 2004/0019653 A1* | 1/2004 | Debaty et al. ................. | 709/217 |
| 2005/0228860 A1* | 10/2005 | Hamynen ......... | G06F 17/30241 |
| | | | 709/203 |
| 2009/0234814 A1* | 9/2009 | Boerries et al. .................... | 707/3 |

FOREIGN PATENT DOCUMENTS

| WO | 2011044446 A2 | 4/2011 |
|---|---|---|
| WO | 2011082115 A1 | 7/2011 |
| WO | 2012097139 | 7/2012 |

OTHER PUBLICATIONS

International Search Report and Written Opinion—PCT/US2014/018570—ISA/EPO—Jun. 4, 2014.

* cited by examiner

*Primary Examiner* — Wing F Chan
*Assistant Examiner* — Joseph Maniwang
(74) *Attorney, Agent, or Firm* — Smith Risley Tempel Blaha LLC (57) ABSTRACT

A method for providing contextual content to a device includes determining context of a device, applying metadata to a request for a website, the metadata corresponding to the context of the device, sending the metadata to the website, and receiving from the website content based on the context.

12 Claims, 8 Drawing Sheets

METHOD AND APPARATUS FOR PROVIDING CONTEXTUAL CONTEXT TO A USER DEVICE

CROSS-REFERENCE TO RELATED APPLICATION

The present application claims priority to U.S. Patent Application No. 61/771,485, filed Mar. 1, 2013, which is incorporated herein by reference in its entirety.

DESCRIPTION OF THE RELATED ART

Information in the form of content from websites is typically provided to many different types of devices and users. One type of device and user that is increasingly receiving more and more web content is a mobile device and a mobile user. A mobile device can be a portable computing device, a tablet computer, a smart phone, or any other portable, or mobile device that is capable of browsing and receiving web content.

One of the ongoing challenges when providing content to a user, and more particularly, to a mobile user, concerns the user's context, and how to provide content to the user based on the user's context. Examples of user context include, but are not limited to, location, whether the user is mobile or stationary, whether the user is driving, walking, shopping, traveling, indoors, outdoors, etc.

Therefore, it would be desirable to have a way of determining a user's context and then providing content to the user based on the context.

SUMMARY

An embodiment of a method for providing contextual content to a device includes determining context of a device, applying metadata to a request for a website, the metadata corresponding to the context of the device, sending the metadata to the website, and receiving from the website content based on the context.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the term "user device" includes a device capable of receiving content from a web site and transmitting information to a website. A user device can be a stationary device or a mobile device.

As used herein, the term "user" refers to an individual receiving content on a user device and transmitting information to a website.

As used herein, the term "context" refers to any or all attributes of the user or the user device, such as physical, logical, social and other contextual information.

As used herein, the terms "context aware metadata" and "contextual metadata" refer to metadata that describes or defines the context of a user or a user device.

As used herein, the terms "context aware content" and "contextual content" refer to content that is delivered to a user device and that is tailored to a user's context.

Figure 1:
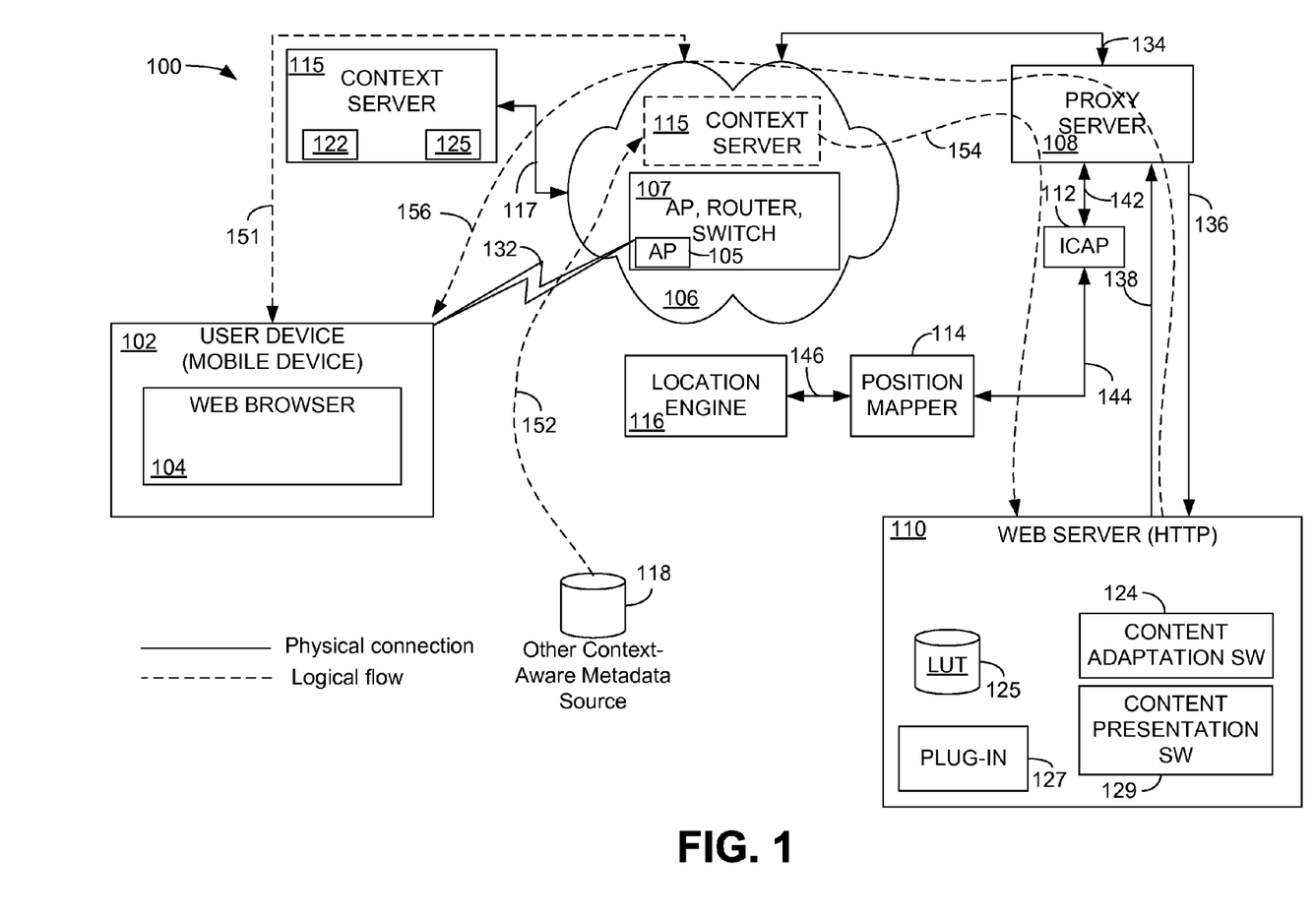
FIG. 1 is a functional block diagram of an embodiment of a method and apparatus for providing contextual content to a user device.

FIG. 1 is a functional block diagram of an embodiment of a method and apparatus for providing contextual content to a user device. The apparatus 100 comprises a user device 102, a network 106, a proxy server 108, a context server 115, and a web server 110. The user device 102 comprises a browser 104, such as a hypertext transfer protocol (HTTP) web browser 104 for accessing and viewing web content. The web server 110 can be an HTTP server. The user device 102 can be a stationary device or a mobile device. In an embodiment, the user device 102 is a mobile device, such as a smart phone, tablet, or other computing device that can connect to the Internet. In an embodiment, the network 106 comprises a number of functions, including, but not limited to, a wireless access point (AP), a router, a switch, a domain name server (DNS), a dynamic host configuration protocol (DHCP) server, and other functions, all embodied by functional block 107. A wireless access point 105 is shown for illustration as the access point access point to which the user device 102 is wirelessly connected. The network 106 may comprise additional access points and may comprise a network of access points and related infrastructure forming a wireless network. The network 106 can comprise one or more of a local area network (LAN), a wide area network (WAN), and can also comprise at least portions the world wide web.

The context server 115 can comprise a server computing device that can be located internal to or external to the network 106. In an embodiment, the context server 115 is located external to the network 106 and is connected to the network 106 over a bi-directional communication channel 117 so that it can operatively communicate with any of the elements connected to the network 106. The context server 115 is also depicted in dotted line inside of the network 106 to indicate that the functionality described with respect to the context server 115 may occur within the network 106. The context server 115 can comprise one or more hardware elements and software modules that can enable the context server 115 to route for contextual redirections, and manage the flow of context aware metadata, in that it applies, appends, attaches, or otherwise associates metadata to an HTTP or HTTPS request received from the user device 102, where the metadata identifies the context of the user device 102 and provides context aware metadata to the proxy server 108 and web server 110. The context aware metadata can be appended to an HTTP or HTTPS request sent by the user device 102, the metadata defining, corresponding to, or otherwise identifying the context of the user device 102. The context of the user device may be, for example, whether the user device is moving or stationary, the specific location of the user device, whether the user of the user device is walking, shopping, driving, indoors, out of doors, etc. An example of providing context aware content is a website tailoring content provided to a user based on whether, for example, the user is at a retail location or shopping on-line.

In an embodiment, the context server 115 may comprise a context awareness metadata software module 122, which generally manages the flow of context aware metadata. The context server 115 also may comprise a network-based monitoring software module 125, which can comprise one or more software modules or elements that allow the context server 115 to monitor and communicate with any element connected to the network 106 to monitor, extract, or otherwise obtain contextual information about a user device 102 connected to the network 106 without the user device 102 sending the contextual information.

The apparatus 100 also comprises an Internet content adaptation protocol (ICAP) element 112, a position mapper 114 and a location engine 116. The ICAP element 112 runs an HTTP-like protocol which is used to extend a transparent proxy server, such as the proxy server 108, thereby freeing resources and standardizing the way in which functionality can be implemented.

The location engine 116 provides the current location of the user device 102. The location engine 116 can use any of triangulation, latency or access point data to detect the current location of the user device 102 typically by using information exchanged between the user device 102 and the access point 105 or other access points while the user device 102 is scanning for available WiFi access points. Typically, a WiFi network identifies a user device 102 using a media access control (MAC) address, which is a unique address assigned to each user device 102. When a user device 102 desires to communicate with a web server 110, the user device will send a dynamic host configuration protocol (DHCP) request to the network 106. A DHCP server (not shown) connected with the network 106 will issue the user device 102 an internet Protocol (IP) address. The IP address allows the user device 102 to communicate with the web server 110 via the network 106 and proxy server 108 using HTTP or HTTPS.

Depending on the implementation, the context awareness metadata software 122 manages one or more of the proxy server 108, ICAP element 112, position mapper 114, and the location engine 116 to identify the context of the user device 102 and provide, append, or otherwise associate context aware metadata with a request from the user device 102.

The ICAP element 112 receives a request for a modified header from the proxy server 108, the request for a modified to include contextual awareness metadata. The ICAP element 112 then requests the location of the user device 102 from the position mapper 114.

The location engine 116 provides the current location of the user device 102 to the position mapper 114. The location engine 116 can use one or more of triangulation, latency data or access point connection data to detect the current location of the user device 102.

The position mapper 114 receives IP and MAC address information related to the user device 102 from the network 106, and also receives location information related to the user device 102 from the location engine 116. The position mapper 114 uses the IP and MAC address of the user device 102 and the location of the user device 102 to return the location of the user device 102 to the ICAP element 112.

In particular, the position mapper 114 takes the IP address of the user device 102, and requests location information from the location engine 116 based on the MAC address of the user device 102. The position mapper 114 then returns location information to the ICAP element 112, which requested contextual information for the user device 102. In this manner, location information related to the user device 102 is sent back to the ICAP element 112, and the ICAP element 112 provides a modified HTTP header to the proxy server 108 with the location information of the user device 102. The obtaining of the contextual information related to the user device 102 is depicted using the logical connection 154. The proxy server 108 receives the modified header and provides a modified HTTP request to the web server 110, the modified request having the current location of the user device 102, thus allowing the web server 110 to provide contextual content to the user device 102 based on the device location.

The apparatus 100 also comprises a number of physical connections and logical connections. The term "physical" connection is meant to include any wired or wireless connection. The term "logical" connection is meant to include a connection that may occur between or among two or more devices without a direct physical connection. The physical connections are shown in solid line while the logical connections are shown in dotted line. Regardless of whether the connections are logical or physical, the connections can be wireless, wired, or any other connection known to those having ordinary skill in the art.

The user device 102 is connected to the network 106 over a wireless connection 132, which is also depicted as a logical connection 151. If externally implemented, the context server 115 is connected to the network 106 over a physical connection 117. The proxy server 108 is connected to the network 106 over a physical connection 134. The proxy server 108 is connected to the web server 110 over physical connections 136 and 138. The connections 136 and 138 may also traverse the network 106. The proxy server 108 is also connected to the ICAP element 112 over physical connection 142. The ICAP element 112 is connected to the position mapper 114 over physical connection 144. The position mapper 114 is connected to the location engine 116 over physical connection 146. The physical connections 117, 132, 134, 136, 138, 142, 144 and 146 can be any wired or wireless connections as known to those having ordinary skill in the art.

The web server 110 comprises a content adaptation software element 124 and a content presentation software element 129, a lookup table 125, and a software plug-in 127. The apparatus 100 also comprises a database 118 that is logically connected to the context server 115 over logical connection 152. The database 118 includes content aware metadata from sources other than the user device 102.

In the embodiment shown in FIG. 1, the method and apparatus for providing contextual content to a user device generally includes a standard, non-modified, user device 102. The context awareness is provided by one or more of the web server 110, the context server 115 and the network 106. In an embodiment, any or all of the web server 110, the context server 115 and the network 106 are configured to access the user's context by one or more of 1) interrogating the user device 102, 2) receiving contextual metadata regarding the user device with the HTTP request, and 3) by interrogating network devices which have or which can infer the user device's context through network and radio frequency (RF) surveillance. When the user device's context is determined, the web server 110 can adapt content transferred to the web browser 104 through one or more of the following mechanisms: 1) use a static mechanism, such as the data lookup table 125, which can be encoded in extensible markup language (XML), hypertext markup language (HTML), or other languages, to select specific HTML, XML, and other content according to a specific user context, and 2) use a dynamic mechanism, perhaps through server-side software plug-in module 127, to select specific HTML, XML, or other content according to a specific user context. The context aware content provided to the user device 102 is depicted over logical connection 156.

Figure 2:
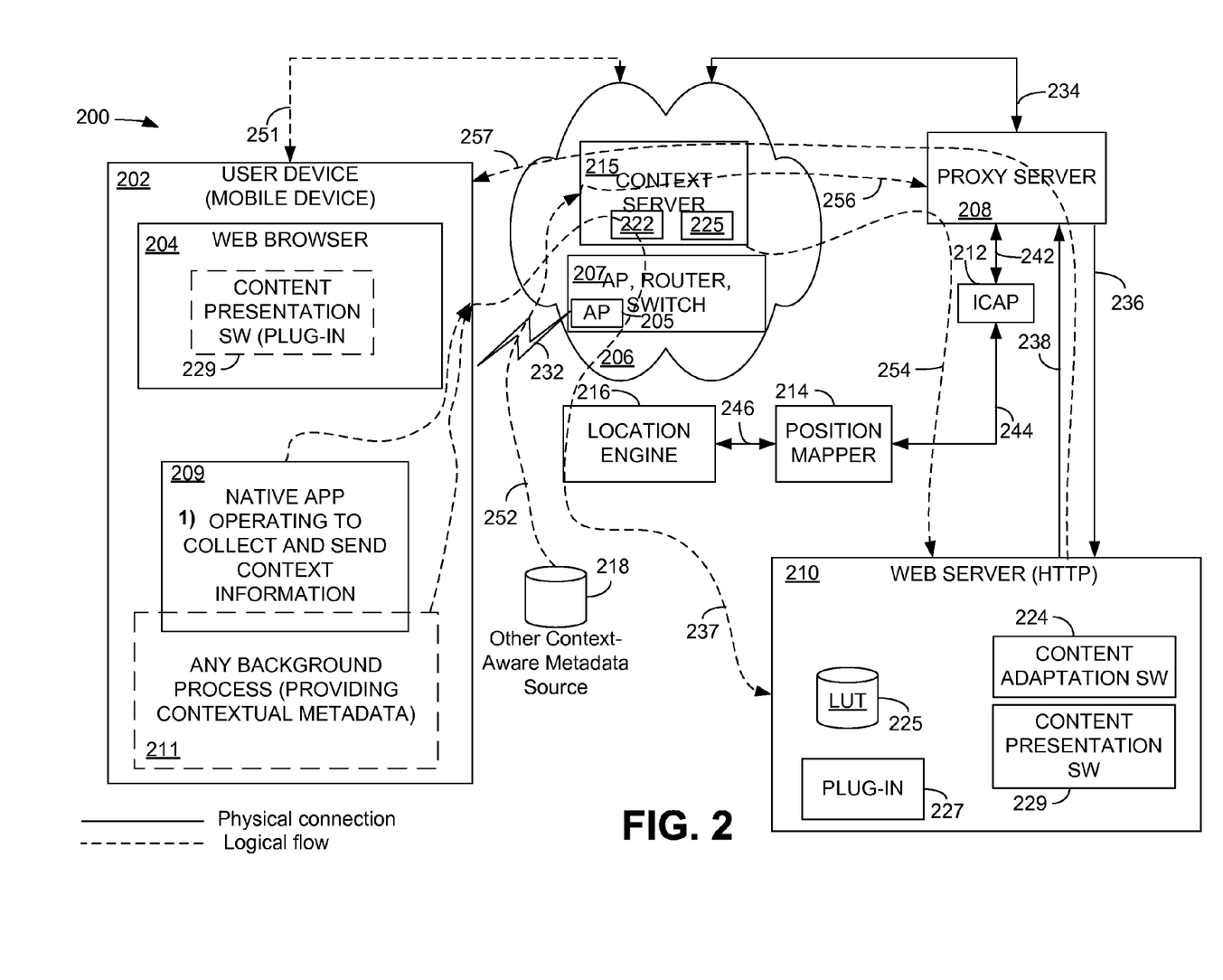
FIG. 2 is a functional block diagram of another embodiment of a method and apparatus for providing contextual content to a user device.

FIG. 2 is a functional block diagram of another embodiment of a method and apparatus for providing contextual content to a user device. Elements in FIG. 2 that are similar to corresponding elements in FIG. 1 are labeled using the convention 2XX, where XX in FIG. 2 is similar to a corresponding element 1XX in FIG. 1.

The apparatus 200 comprises a user device 202, a network 206, a context server 215, a proxy server 208, and a web server 210. The user device 202 comprises a browser 204, such as a hypertext transfer protocol (HTTP) web browser 204 for accessing and viewing web content.

In the embodiment shown in FIG. 2, the user device 202 also comprises a software module 209 configured to allow the user device 202 to provide context aware metadata. In an embodiment, the software module 209 can be a native application located on the user device 202 that can access a native application program interface (API) and therefore can understand and have access to contextual information related to the user device 202. Such a native application 209 can be a time management application, such as a calendaring application, a location-based time keeping application, or any application that can capture contextual information related to the user device 202 and the user of the device 202 without the interaction of the web browser 204.

Further, as depicted in dotted line within the user device 202, any background process 211 that can provide contextual metadata can be associated with the user device 202 to provide contextual metadata without the interaction of the web browser 204. The user device 202 also comprises an optional software module 229, which can be a plug-in, or other code that provides the ability to display contextual based content on the user device 202 through the web browser 204.

The user device 202 can be a stationary device or a mobile device. In an embodiment, the user device 202 is a mobile device, such as a smart phone, a tablet computing device, or any other computing device that can connect to the Internet.

In an embodiment, the network 206 comprises a number of functions, including, but not limited to, a wireless access point (AP), a router, a switch, a domain name server (DNS), a dynamic host configuration protocol (DHCP) server and other functions, all embodied by functional block 207. A wireless access point 205 is shown for illustration as the access point to which the user device 202 is wirelessly connected. The network 206 may comprise additional access points and may comprise a network of access points and related infrastructure forming a wireless network. The network 206 can comprise one or more of a local area network (LAN), a wide area network (WAN), and can also comprise at least portions the world wide web.

In the embodiment shown in FIG. 2, the context server 215 is illustrated as being within the network 206; however, the context server 215 can be located outside of the network 206, as shown in FIG. 1.

In an embodiment, the context server 215 may comprise a context awareness metadata software module 222, which provides, routes, or otherwise manages the flow of context aware metadata, in that it applies, appends, attaches, or otherwise associates metadata to an HTTP or HTTPS request received from the user device 202. The metadata identifies the context of the user device 202 and provides context aware metadata to the proxy server 208. The context server 215 also may comprise a network-based monitoring software module 225, which can comprise one or more software modules or elements that allow the context server 215 to monitor and communicate with any element connected to the network 206 to monitor, extract, or otherwise obtain contextual information from a user device 202 connected to the network 206, or to process contextual information provided by the native application 209 and/or the background process 211, on the user device 202.

The context aware metadata is appended to an HTTP or HTTPS request sent by the user device 202, the metadata defining, corresponding to, or otherwise identifying the context of the user device 202.

The apparatus 200 also comprises an Internet content adaptation protocol (ICAP) element 212, a position mapper 214 and a location engine 216. The ICAP element 212 runs an HTTP-like protocol which is used to extend a transparent proxy server, such as the proxy server 208, thereby freeing resources and standardizing the way in which functionality can be implemented.

The location engine 216 provides the current location of the user device 202. The location engine 216 can use any of triangulation, latency or access point data to detect the current location of the user device 202 typically by using information exchanged between the user device 202 and the access point 205 or other access points while the user device 202 is scanning for available WiFi access points. Typically, a WiFi network identifies a user device 202 using a media access control (MAC) address, which is a unique address assigned to each user device 202. When a user device 202 desires to communicate with a web server 210, the user device will send a dynamic host configuration protocol (DHCP) request to the network 206. A DHCP server (not shown) connected with the network 206 will issue the user device 202 an internet Protocol (IP) address. The IP address allows the user device 202 to communicate with the web server 210 via the network 206 and proxy server 208 using HTTP or HTTPS.

Depending on the implementation, the context awareness metadata software 222 manages one or more of the proxy server 208, ICAP element 212, position mapper 214, and the location engine 216 to identify the context of the user device 202 and provide context aware metadata.

The ICAP element 212 receives a request for a modified header from the proxy server 208, the request for a modified header to include contextual awareness metadata. The ICAP element 212 then requests the location of the user device 202 from the position mapper 214.

The location engine 216 provides the current location of the user device 202 to the position mapper 214. The location engine 216 can use one or more of triangulation, latency data or access point connection data to detect the current location of the user device 202.

The position mapper 214 receives IP and MAC address information related to the user device 202 from the network 206, and also receives location information related to the user device 202 from the location engine 216. The position mapper 214 uses the IP and MAC address of the user device 202 and the location of the user device 202 to return the location of the user device 102 to the ICAP element 212.

In particular, the position mapper 214 takes the IP address of the user device 202, and requests location information from the location engine 216 based on the MAC address of the user device 202. The position mapper 214 then returns location information to the ICAP element 212, which requested contextual information for the user device 202. In this manner, location information related to the user device 202 is sent back to the ICAP element 212, and the ICAP element 212 provides a modified HTTP header to the proxy server 208 with the location information of the user device 202. The obtaining of the contextual information related to the user device 202 is depicted using the logical connection 256. The proxy server 208 receives the modified header and provides a modified HTTP request to the web server 210, the modified request having the current location of the user device 202, thus allowing the web server 210 to provide contextual content to the user device 202 based on the location of the user device 202.

The apparatus 200 also comprises a number of physical connections and logical connections. The term "physical" connection is meant to include any wired or wireless connection. The term "logical" connection is meant to include a connection that may occur between or among two or more devices without a direct physical connection. The physical connections are shown in solid line while the logical connections are shown in dotted line. Regardless of whether the connections are logical or physical, the connections can be wireless, wired, or any other connection known to those having ordinary skill in the art.

The user device 202 is connected to the network 206 over a wireless connection 232, which is also depicted as a logical connection 251. The proxy server 208 is connected to the network 206 over a physical connection 234. The proxy server 208 is connected to the web server 210 over physical connections 236 and 238. The connections 236 and 238 may also traverse the network 206. The proxy server 208 is also connected to the ICAP element 212 over physical connection 242. The ICAP element 212 is connected to the position mapper 214 over physical connection 244. The position mapper 214 is connected to the location engine 216 over physical connection 246. The physical connections 232, 234, 236, 238, 242, 244 and 246 can be any wired or wireless connections as known to those having ordinary skill in the art.

The web server 210 comprises a content adaptation software element 224 and a content presentation software element 229, a lookup table 225, and a software plug-in 227. The transfer of contextual metadata from the user device 202 to the web server 210 without the interaction of the web browser 204 is also depicted using a logical connection 237.

The apparatus 200 also comprises a database 218 that is logically connected to the user device 202 over logical connection 252. The database 218 includes content aware metadata from sources other than the user device 202.

In the embodiment shown in FIG. 2, the method and apparatus for providing contextual content to a user device generally uses a user device 202 that is capable of directly or indirectly sending context aware metadata to the web server 210.

In the embodiment shown in FIG. 2, the context awareness can be provided by the user device 202, but local network security may not permit the transfer of the context aware metadata to the web server 210. Embodiments described herein are useful where context awareness metadata is being provided by a software program, such as the native application 209, running on the user device 202, a background process 211 running on the user device 202, a network of radios (access points 205) surveilling user devices 202, and other sources while being used by a software program running on the same or co-located mobile device within a "web browser" or other HTML framework which is prevented from being able to directly access the context awareness metadata due to local security.

The flow of the context aware metadata described here allows an HTTP client application (such as a web browser) to receive and process the context awareness metadata without requiring local access to the mobile device's sensors, memory, processors, radios, and other context awareness inputs.

In the embodiment shown in FIG. 2, context aware metadata is transferred from the user device 202 to the web server 210 using a combination of the software module 209 running on the user device 202, the context server 215, the network 206, and the content adaptation software module 224 running on the web server 210. In this embodiment, the context awareness metadata software 222 can run on a data transmission network, such as a WiFi, or other network operating under the IEEE 802.11b/g/n, standard, to allow the network to unobtrusively monitor a user device 202 that is sending context aware metadata to the web server 210.

In an embodiment, it is possible to correlate the context aware metadata provided by the application 209 and/or the background process 211 with ordinary web traffic from the web browser 204 so that the web server 210 can recognize that the particular call is originating from the same device (user device 202) that has the application 209 and/or the background process 211 that is providing the contextual awareness metadata. For example, at a time that a page is loaded in the web browser 204, a cookie or other identifier could be passed to the background process 211 using, for example, an AJAX call, such that a web page passes a unique ID of the user device 202 to the background process 211 and to the context server 215. In this manner, when the background process 211 communicates to the context server 215, it can pass the cookie or other identifier that a previous web page/site has established. So at the time a web page access request goes through the proxy server 208, the same cookie or identifier is passed along with the request, the proxy server 208 intercepts it, and passes it to the context server 215 so that the context server 215 can recognize the user of the user device 202.

Figure 3:
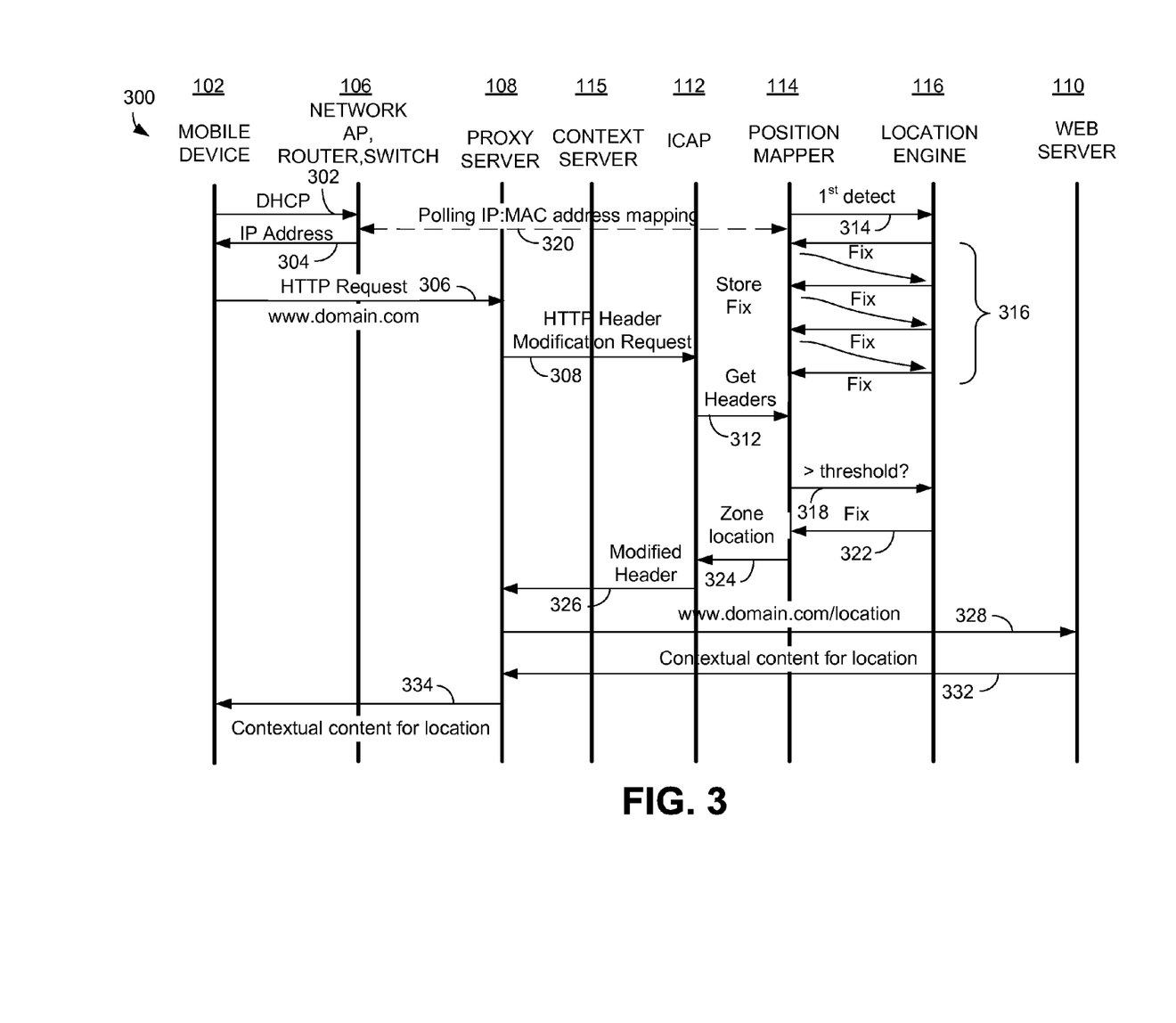
FIG. 3 is a call flow diagram illustrating an embodiment of a method for providing contextual content to a mobile device as part of the apparatus shown in FIG. 1.

FIG. 3 is a call flow diagram illustrating an embodiment of a method for providing contextual content to a mobile device as part of the system shown in FIG. 1.

The diagram 300 illustrates the operation of various elements in FIG. 1 for reference, but is also at least partially applicable to the embodiment shown in FIG. 2. As an example, call 302 represents a dynamic host configuration protocol (DHCP) request sent from the mobile device 102 to the network 106. In response, the network 106 returns a call 304, assigning an Internet Protocol (IP) address to the user device 102, thus allowing the user device 102 to access and communicate over the network 106.

The call 306 illustrates an HTTP request for a website (e.g., www.domain.com) made by the user device 102 and forwarded through the network 106 to the proxy server 108. The call 320 represents IP and media access control (MAC) address mapping between the network 106 and the position mapper 114. To summarize the call 320, the position mapper 114 takes the IP address of the user device 102, and requests location information from the location engine 116 based on the MAC address of the user device 102 received from the network 106. The position mapper 114 then associates the IP address and the MAC address. The position mapper 114 then returns location information to the ICAP element 112, which requested contextual information for the user device 102. In this manner, location information related to the user device 102 is sent back to the ICAP element 112, and the ICAP element 112 provides a modified HTTP header to the proxy server 108 with the location information of the user device 102. In this manner, location information and, to a broader extent, context information related to the user device 102 is added to the HTTP request either explicitly or implicitly.

The call 308 represents the transfer of a request for a modified HTTP header sent from the proxy server 108 to the ICAP element 112. The request for a modified HTTP header is sent from the proxy server 108 over connection 142, and includes context aware metadata pertaining to the context of the user device 102. In an embodiment, the context of the user device can be determined in a number of different ways. In the example shown in FIG. 1, the context of the user device 102 is determined by one or more of the network 106, the context server 115, and the web server 110, without any contribution or interaction from the user device 102. In other words, the user device 102 is a standard, unmodified device and any context awareness is determined by elements other than the user device 102. In an embodiment, one or more of the network 106, the context server 115, and the web server 110 determines the context of the user device 102 based on network parameters, or based on information contained in the database 118 which can provide other context aware metadata sources. The flow of context aware metadata from the user device 102 to the web server 110 is illustrated using logical connections 152 and/or 154.

The call 312 issued between the ICAP element 112 and the position mapper 114 is made over connection 144 to determine the position of the user device 102 and to obtain modified header information.

The call 314 made between the position mapper 114 and location engine 116 over connection 146 refers to a first detection of the location of the user device 102. The immediate polling requests improve the user experience by shortening the perceived time to first fix (TTFF). The calls 316 refer to a series of polling intervals and position location fixes that occur in real time between the position mapper 114 and the location engine 116 to determine the location of the user device 102 after the initial request by the call 314. The polling intervals can be any duration, can be configurable, and, in an example, can be one (1) second.

The call 318 attempts to determine whether a threshold is met.

The call 322 fixes the location of the user device 102, whereby the location engine 116 fixes the location of the user device 102 and communicates the location to the position mapper 114. The call 324 is provided from the position mapper 114 to the ICAP element 112 and refers to a "geofenced zone" location. As used herein, a "geofenced zone" location refers to a geographic area that is monitored for the presence of a user device 102 and a user. In an embodiment, such a geofenced zone can comprise an attraction at an amusement facility, a performance venue, or any other area that can be monitored using one or more technologies, such as GPS, radio frequency identification (RFID), video surveillance, etc.

The call 326 issued from the ICAP element 112 to the proxy server 108 over connection 142 provides a modified HTTP header to the proxy server 108. The modified HTTP header includes the context aware metadata and also includes the location of the user device 102.

The call 328 provided from the proxy server 108 to the web server 110 over connection 136 includes a modified HTTP request having context aware metadata and includes the location of the user device 102. The call 332 from the web server 110 to the proxy server 108 over connection 138 includes contextual content that is tailored to the user based on the location and context of the user device 102. The call 334 provided from the proxy server 108 to the mobile device 102 over connections 134 and 132 includes the context aware content delivered to the user device 102, and is also shown for reference as traveling over logical connection 156. In this manner, the context of the user device 102 is determined and contextual content is provided from the web server 110 to the user device 102.

Figure 4:
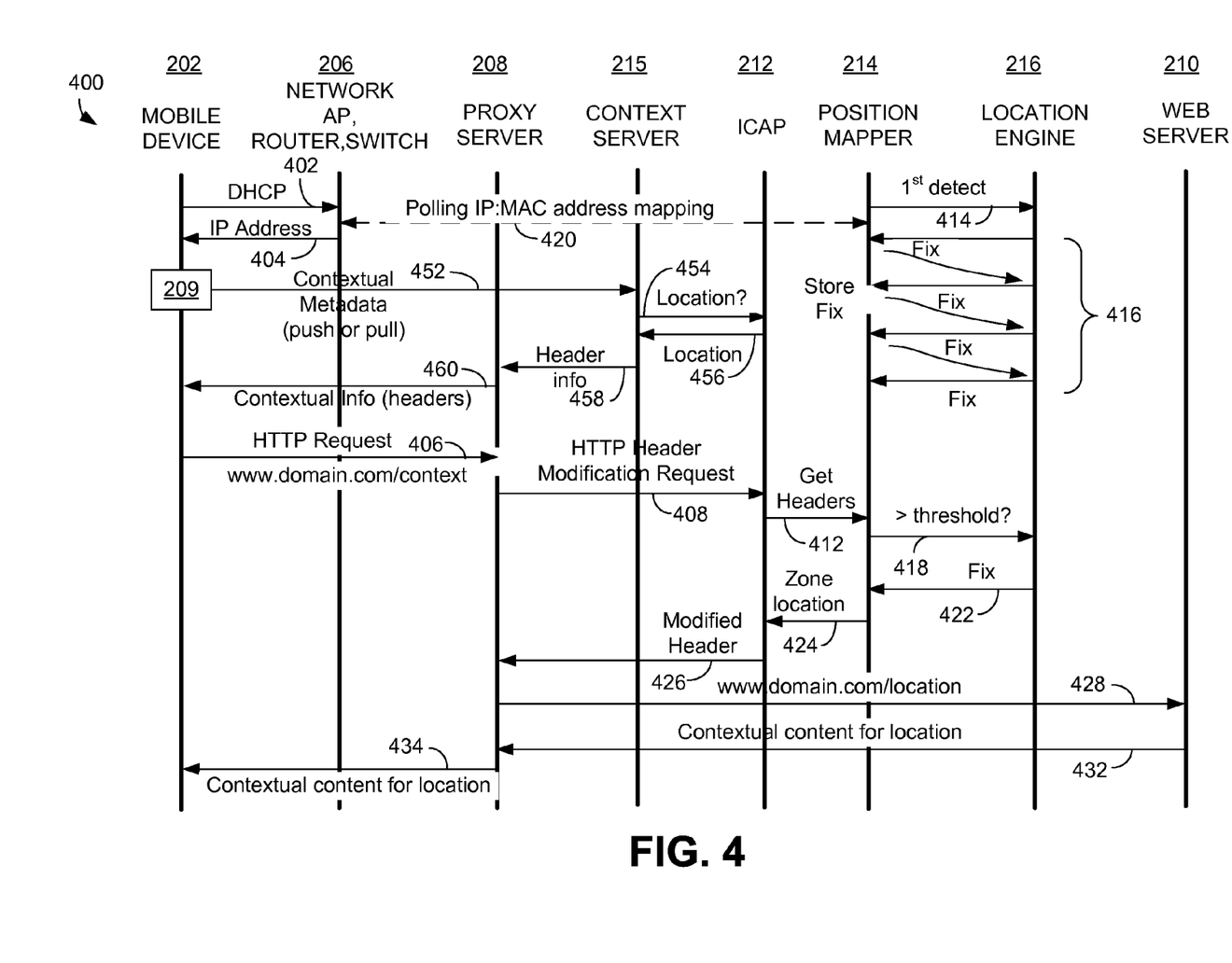
FIG. 4 is a call flow diagram illustrating another embodiment of a method for providing contextual content to a mobile device as part of the apparatus shown in FIG. 2.

FIG. 4 is a call flow diagram 400 illustrating another embodiment of a method for providing contextual content to a mobile device as part of the apparatus shown in FIG. 2.

As an example, call 402 represents a dynamic host configuration protocol (DHCP) request sent from the mobile device 202 to the network 206. In response, the network 206 returns a call 404, assigning an Internet Protocol (IP) address to the user device 202, thus allowing the user device 202 to access and communicate over the network 206.

Prior to, or continuously with the user device 202 communicating with the web server 210 via the network 206, the native application 209 issues a call 452 to the context server 215. The call 452 includes contextual metadata that is sent from the native application 209 to the context server 215 outside of the operation of the web browser 204. The call may be initiated by the native application 209, or may be in response to a poll, a request, or some other communication from the context server 215. The call 452 may also incorporate information from the background process 211.

The call 454 sent from the context server 215 to the ICAP element 212 includes a location request pertaining to the user device 202.

The call 456 sent from the ICAP element 212 to the context server 215 includes the location of the user device 202.

The call 458 from the context server 215 to the proxy server 208 includes header information pertaining to the location and context of the user device 202.

The call 460 from the proxy server 208 to the user device 202 includes contextual information related to the user device 202.

The call 406 illustrates an HTTP request for a website (e.g., www.domain.com) made by the user device 202 and forwarded through the network 206 to the proxy server 208. The call 406 includes the contextual information that was received by the user device 202 in the call 460 described above.

The call 420 represents IP and media access control (MAC) address mapping between the network 206 and the position mapper 214. To summarize the call 420, the position mapper 214 takes the IP address of the user device 202, and requests location information from the location engine 216 based on the MAC address of the user device 202 received from the network 206. The position mapper 214 then associates the IP address and the MAC address. The position mapper 214 then returns location information to the ICAP element 212, which requested contextual information for the user device 202. In this manner, location information related to the user device 202 is sent back to the ICAP element 212, and the ICAP element 212 provides a modified HTTP header to the proxy server 208 with the location information of the user device 202. In this manner, location information and, to a broader extent, context information related to the user device 202 is added to the HTTP request either explicitly or implicitly.

The call 408 represents the transfer of a request for a modified HTTP header sent from the proxy server 208 to the ICAP element 212. The request for a modified HTTP header is sent from the proxy server 208 over connection 242, and includes context aware metadata pertaining to the context of the user device 202. In an embodiment, the context of the user device can be determined in a number of different ways. In the example shown in FIG. 2, the context of the user device 202 is determined by one or more of the native application 209, network 206, the context server 215, and the web server 210. The flow of context aware metadata from the user device 202 to the web server 210 is illustrated using logical connection 237.

The call 412 issued between the ICAP element 212 and the position mapper 214 is made over connection 244 to determine the position of the user device 202 and to obtain modified header information.

The call 414 made between the position mapper 214 and location engine 216 over connection 246 refers to a first detection of the location of the user device 202. The immediate polling requests improve the user experience by shortening the perceived time to first fix (TTFF). The calls 416 refer to a series of polling intervals and position location fixes that occur in real time between the position mapper 214 and the location engine 216 to determine the location of the user device 202 after the initial request by the call 414. The polling intervals can be any duration, can be configurable, and, in an example, can be one (1) second. The call 418 attempts to determine whether a threshold is met.

The call 422 fixes the location of the user device 202, whereby the location engine 216 fixes the location of the user device 202 and communicates the location to the position mapper 214.

The call 424 is provided from the position mapper 214 to the ICAP element 212 and refers to a "geofenced zone" location. As used herein, a "geofenced zone" location refers to a geographic area that is monitored for the presence of a user device 202 and a user. In an embodiment, such a geofenced zone can comprise an attraction at an amusement facility, a performance venue, or any other area that can be monitored using one or more technologies, such as GPS, radio frequency identification (RFID), video surveillance, etc.

The call 426 issued from the ICAP element 212 to the proxy server 208 over connection 242 provides a modified HTTP header to the proxy server 208. The modified HTTP header includes the context aware metadata and also includes the location of the user device 202.

The call 428 provided from the proxy server 208 to the web server 210 over connection 236 includes a modified HTTP request having context aware metadata and includes the location of the user device 202.

The call 432 from the web server 210 to the proxy server 208 over connection 238 includes contextual content that is tailored to the user based on the location and context of the user device 202. The call 434 provided from the proxy server 208 to the mobile device 202 over connections 234 and 232 includes the contextual content delivered to the user device 202 and is shown over logical connection 257. In this manner, the context of the user device 202 is determined and context specific content is provided from the web server 210 to the user device 202.

Figure 5A:
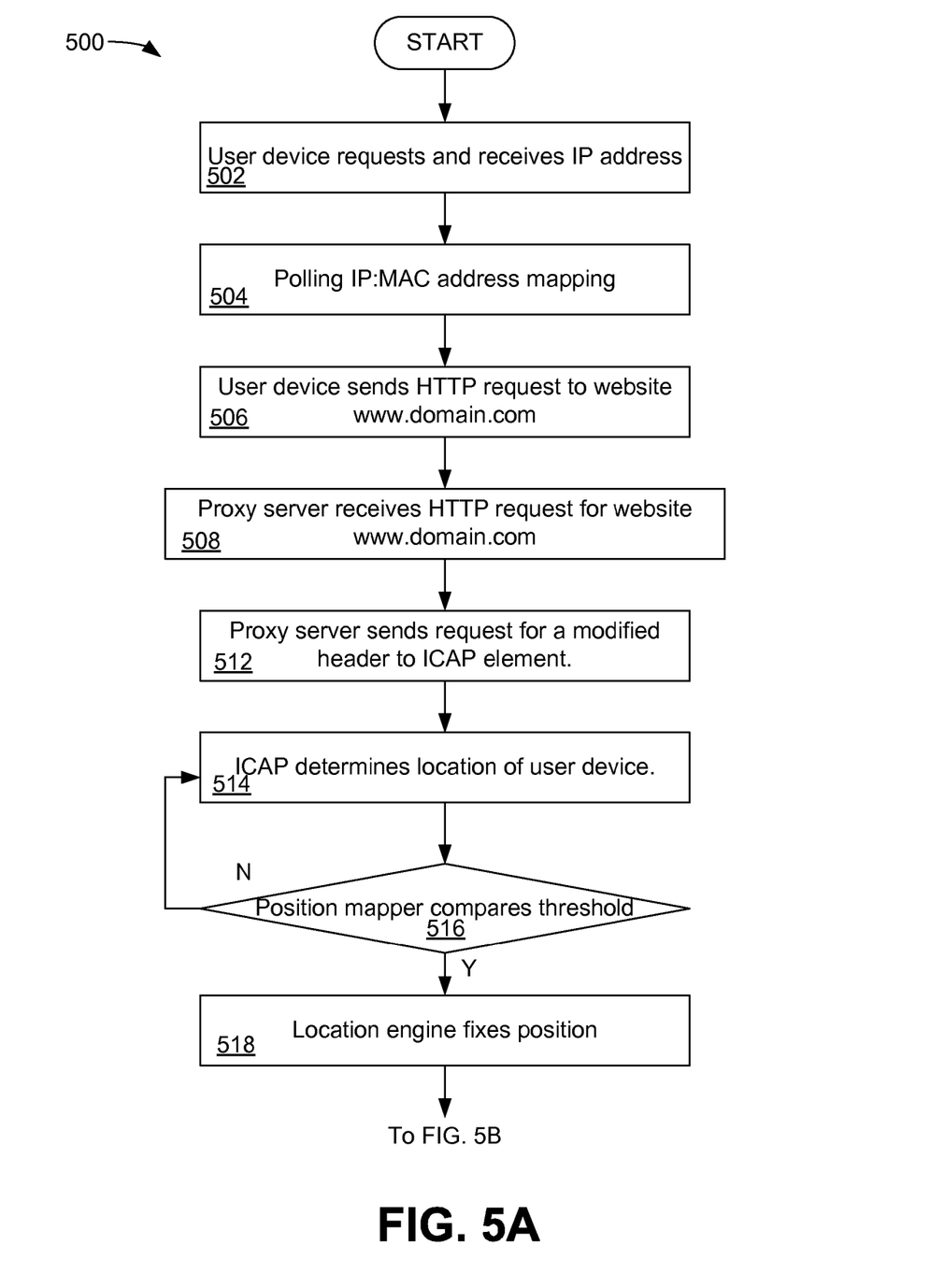
FIGS. 5A and 5B are a flow chart collectively illustrating an embodiment of a method for providing contextual content to a user device.
Figure 5B:
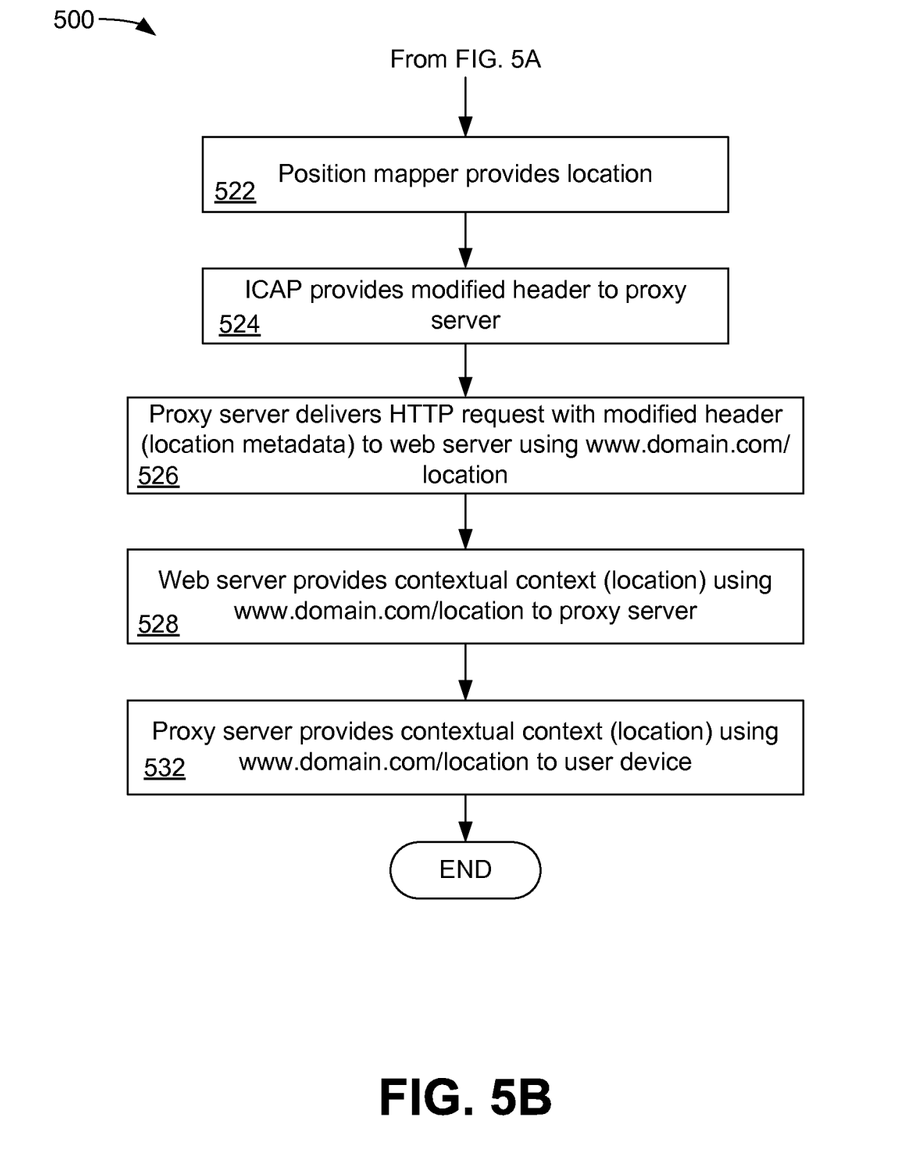

FIGS. 5A and 5B are a flow chart 500 collectively illustrating an embodiment of a method for providing contextual content to a user device.

In block 502, a user device 102 initiates a dynamic host configuration protocol (DHCP) request and sends the request to the network 106. The network 106 responds with an Internet Protocol (IP) address, thus allowing the user device 102 to access and communicate over the network 106.

In block 504, IP:MAC address mapping occurs between the network 106 and the position mapper 114.

In block 506, a user device 102 forwards an HTTP request for a website (e.g., www.domain.com) through the network 106 to the proxy server 108.

In block 508, the proxy server 108 receives the HTTP request for a website (e.g., www.domain.com).

In block 512, the proxy server 108 sends a request for a modified HTTP header to the ICAP element 112. The request for the modified HTTP header is sent from the proxy server 108 over connection 142, and includes context aware metadata pertaining to the context of the user device 102.

In block 514, the ICAP element 112 calls the position mapper 114 to obtain the location of the user device 102. This refers to a series of polling intervals and position location iterations that occur between the position mapper 114 and the location engine 116 to determine the position of the user device 102.

In block 516, the position mapper 114 compares the threshold.

In block 518, the location engine 116 fixes the position of the user device 102, whereby the location engine 116 fixes the location of the user device 102 and communicates the location to the position mapper 114.

In block 522, the position mapper 114 provides the location of the user device 102 to the ICAP element 112 and refers to a "geofenced zone" location, as described above.

In block 524, the ICAP element 112 provides a modified HTTP header to the proxy server 108. The modified HTTP header includes the context aware metadata and also includes the location of the user device 102.

In block 526, the proxy server 108 delivers the modified HTTP request to the web server 110 over connection 136. The modified HTTP request includes context aware metadata and the location of the user device 102.

In block 528, the web server 110 provides content to the proxy server 108, the content including contextual content for the location and context of the user device 102.

In block 532, the proxy server 108 provides the context aware content to the user device 102.

Figure 6A:
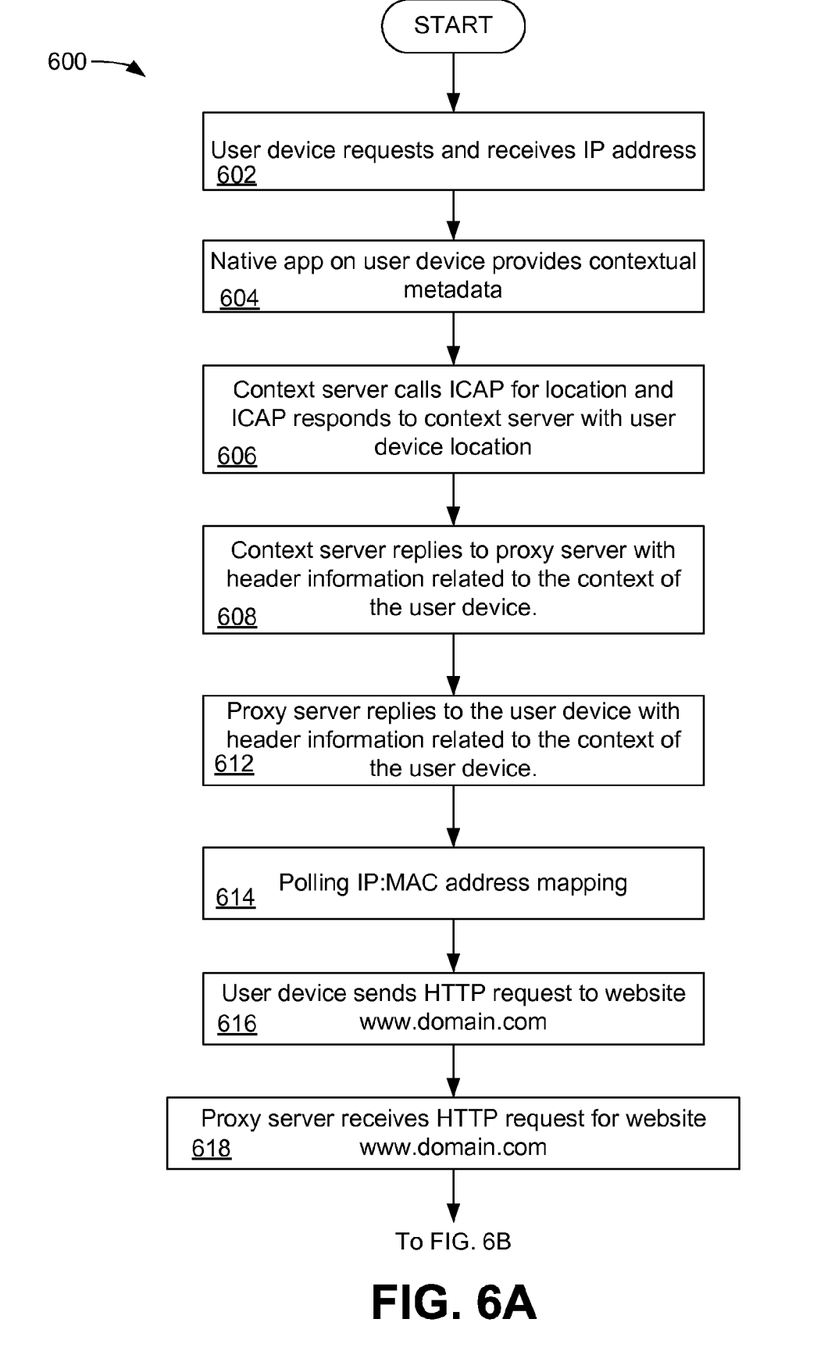
FIGS. 6A and 6B are a flow chart collectively illustrating an alternative embodiment of a method for providing contextual content to a user device.
Figure 6B:
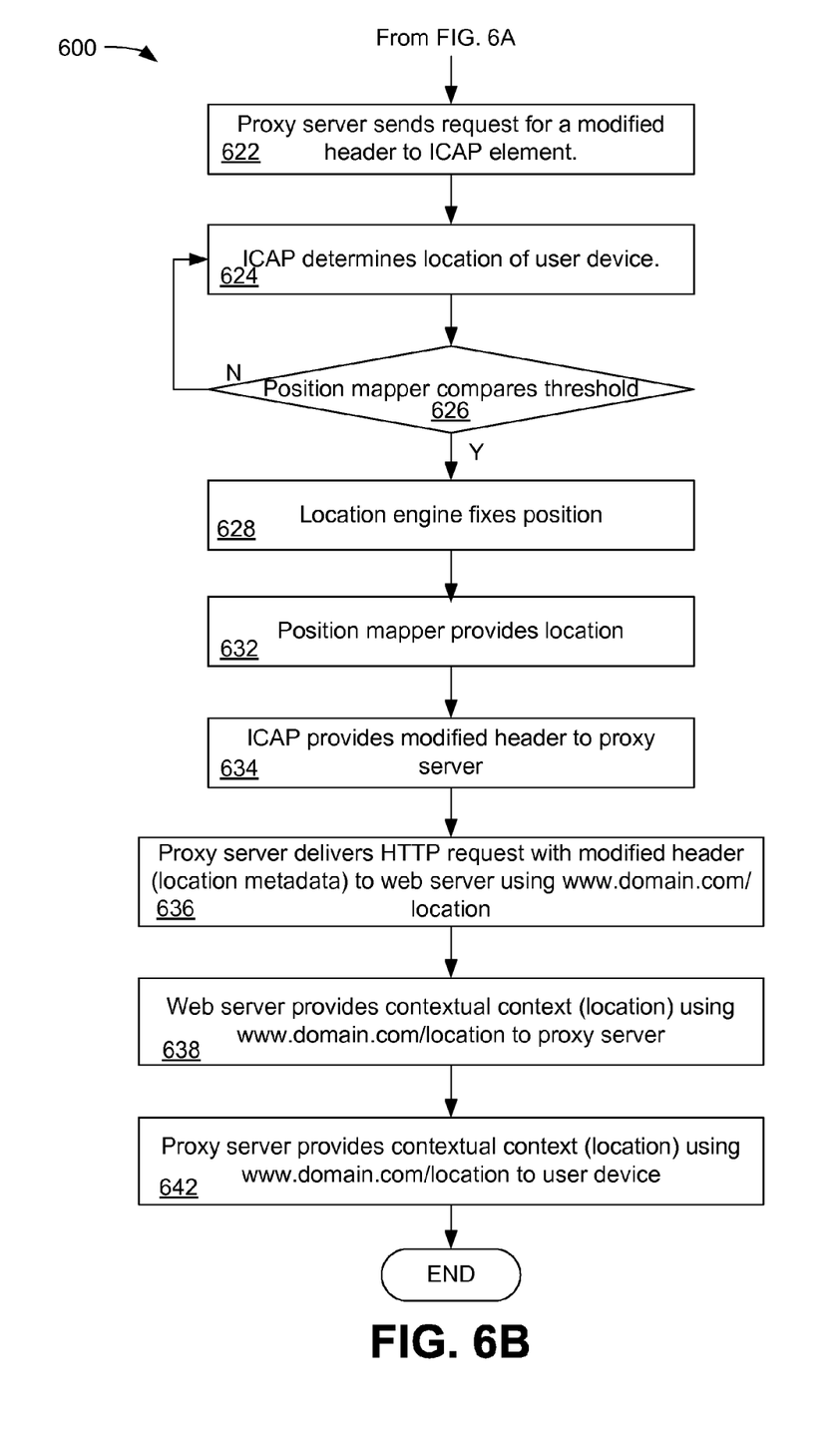

FIGS. 6A and 6B are a flow chart 600 collectively illustrating an alternative embodiment of a method for providing contextual content to a user device.

In block 602, a user device 202 initiates a dynamic host configuration protocol (DHCP) request and sends the request to the network 206. The network 206 responds with an Internet Protocol (IP) address, thus allowing the user device 202 to access and communicate over the network 206.

In block 604, a native application 209 running on the user device 202 actively provides context aware information. In an embodiment, the native application sends contextual information to the context server 215.

In block 606, the context server 215 calls the ICAP element 212 for the location of the user device 202. The ICAP element 212 responds to the call with a location of the user device 202.

In block 608, the context server 215 replies to the proxy server 208 with header information relating to the context of the user device 202.

In block 612, the proxy server 208 replies to the user device 202 with header information relating to the context of the user device 202.

In block 614, IP:MAC address mapping occurs between the network 206 and the position mapper 214.

In block 616, a user device 202 forwards an HTTP request for a website (e.g., www.domain.com) through the network 206 to the proxy server 208. In this embodiment, the HTTP request is modified by contextual information provided by the user device 202 as described above.

In block 618, the proxy server 208 receives the HTTP request for a website (e.g., www.domain.com).

In block 622, the proxy server 208 sends a request for a modified HTTP header to the ICAP element 212. The request for the modified HTTP header is sent from the proxy server 208 over connection 242, and includes context aware metadata pertaining to the context of the user device 202.

In block 624, the ICAP element 212 calls the position mapper 214 to obtain the location of the user device 202. This refers to a series of polling intervals and position locations that occur between the position mapper 214 and the location engine 216 to determine the position of the user device 202.

In block 626, the position mapper 214 compares the threshold.

In block 628, the location engine 216 fixes the location of the user device 202, whereby the location engine 216 fixes the location of the user device 202 and communicates the location to the position mapper 214.

In block 632, the position mapper 214 provides the location of the user device 202 to the ICAP element 212 and refers to a "geofenced zone" location, as described above.

In block 634, the ICAP element 212 provides a modified HTTP header to the proxy server 208. The modified HTTP header includes the context aware metadata and also includes the location of the user device 202.

In block 636, the proxy server 208 delivers the modified HTTP request to the web server 210 over connection 236. The modified HTTP request includes context aware metadata and the location of the user device 202.

In block 638, the web server 210 provides content to the proxy server 208, the content including contextual content for the location and context of the user device 202.

In block 642, the proxy server 208 provides the context aware content to the user device 202 over the logical connection 257.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for providing contextual content to a user device, comprising:

determining context of the user device, wherein at least a portion of the context of the user device is provided directly by the user device;

determining, by a network server, metadata corresponding to the context of the user device;

modifying an HTTP header to contain the metadata;

communicating as part of an HTTP request via a network the HTTP header containing the metadata from the network server to a web server configured to serve content based on the metadata, wherein the portion of the context of the user device is provided directly by the user device before the communicating step and provided directly by the user device independently of an operation of a web browser located on the user device.

2. The method of claim 1, wherein the metadata comprises information describing attributes chosen from physical, logical, social and other contextual information.

3. The method of claim 1, wherein the portion of the context of the user device is determined by interrogating the user device.

4. The method of claim 1, wherein the context of the user device is determined by interrogating the network to which the user device is connected.

5. The method of claim 4, wherein interrogating the network to which the user device is connected comprises performing radio frequency (RF) surveillance.

6. The method of claim 1, wherein the content is determined using a look-up table comprising content specific to the context.

7. The method of claim 1, wherein the content is determined using software plug-in to associate content specific to the context.

8. A system for providing contextual content to a user device connected to a network, comprising:
   a network server configured to receive an HTTP request for a website initiated by the user device, to obtain information indicating a context of the user device including at least a portion obtained directly from the user device, to determine metadata associated with the context, to modify an HTTP header of the HTTP request to contain the metadata; and
   a web server configured to receive the HTTP request from the network server and further configured to serve content based on the metadata contained in the HTTP header, wherein the portion of the context of the user device is obtained directly from the user device before communicating the HTTP request to the web server and obtained directly from the user device independently of an operation of a web browser located on the user device.

9. The system of claim 8, wherein the metadata comprises information describing attributes chosen from physical, logical, social and other contextual information.

10. The system of claim 8, wherein the network interrogates the user device to determine the portion of the context.

11. The system of claim 8, wherein the network comprises metrics that indicate the context of the user device.

12. The system of claim 11, wherein the metrics comprise radio frequency (RF) surveillance.

* * * * *